United States Patent Office 3,773,918
Patented Nov. 20, 1973

3,773,918
STABLE, REACTIVE ALUMINUM HYDROXIDE
DRIED GEL AND METHOD OF MAKING SAME
Stewart M. Beekman, Signal Mountain, Tenn., assignor to
Chattem Chemicals Division of Chattem Drug & Chemical Company, Chattanooga, Tenn.
No Drawing. Continuation-in-part of application Ser. No. 720,446, Apr. 11, 1968. This application Sept. 24, 1971, Ser. No. 183,636
Int. Cl. A61k 27/00; C01f 7/02, 7/34
U.S. Cl. 423—629
6 Claims

ABSTRACT OF THE DISCLOSURE

An improved, highly reactive aluminum hydrogel particularly suitable for use in antacid compositions and characterized by stability and retained reactivity upon prolonged periods of storage. The hydrogel is produced by reacting aluminum chloride with a solution containing alkali metal carbonate ions at a temperature of 0 to 5° C., resulting in the production of a hydrogel containing from 0.5 to 3% by weight aluminum oxide ($Al_2O_3$). The resulting hydrogel is rapidly dried to produce a gel having enhanced stability upon standing, and improved reactivity.

CROSS-REFERENCE TO RELATED APPLICATION

This application is a continuation-in-part of my co-pending application Ser. No. 720,446 filed Apr. 11, 1968.

BACKGROUND OF THE INVENTION

Field of the invention

This invention is directed to an improved dried aluminum hydroxide gel having a low, controlled alkali metal content and to a method of preparing the same involving a low temperature reaction between controlled amounts of aluminum chloride and a solution of an alkali metal carbonate.

DESCRIPTION OF THE PRIOR ART

Aluminum hdyroxide has been used in therapeutics for at least forty-five years, and presently, reactive aluminum hydroxide gel is one of the principal agents used in the treatment of peptic ulcers. Normally, the gel is compounded with insoluble acid reactive magnesium compounds. Although the aluminum hydroxide gel, per se, is quite satisfactory, attempts to form the gel into tablets have not been completely satisfactory, despite the many advances in tabletting technology. One of the reasons for this is the substantial change which takes place during the drying of ordinary aluminum hydroxide gel. When dried, the gel shows a large initial decrease in reaction rate with dilute hydrochloric acid, inhibition in reactivity by gastric pepsin, and reduced reaction rate as a function of aging. For example, Mutch (Quart. J. Pharm. and Pharmacol., vol. 19, p. 940, 1946) found a 460% loss in reaction rate on drying the gel containing 7.8% aluminum oxide to a powder containing 52.5% aluminum oxide at 50° C.

The tendency in more recent times has been to get away from the aluminum hydroxide gel and provide more complex compounds for antacid use, such as aluminum dihydroxy aminoacetate (Krantz et al., J. Pharmacol. Exptl. Therap., vol. 82, p. 247, 1944); aluminum dihydroxy sodium carbonate (Grote et al. J.A. Ph. A., vol. 44, p. 219, 1955); sulfated magnesium aluminate, (U.S. Pat. No. 3,300,277); magnesium aluminate (German Pat. No. 963,182); tetrahydroxy dialuminum magnesium carbonate (U.S. Pat. No. 2,958,626); sodium polyhydroxy aluminum monocarbonate hexitol complex (Gwilt et al., J. Pharm. and Pharmacol., vol. 10, p. 770, 1958); and magnesium aluminum oxyhydroxides (Schmank et al. J. A. Ph. A., vol. 54, p. 1285, 1965). Still other solutions to the problem include the development of co-precipitates of aluminum hydroxide with magnesium and/or calcium carbonate (German Pat. No. 1,053,730) and numerous co-dried combinations of aluminum hydroxide with proteins, amino acids and magnesium compounds.

The present invention is directed to the production of a highly reactive aluminum hydroxide gel in which the alkali metal content is substantially minimized, and which exhibits the rapidity and duration of action with gastric fluid in powder form which was formerly found only in the undried gel.

SUMMARY OF THE INVENTION

The gels produced according to the present invention are prepared by adding aluminum chloride, either as a powder or preferably in an aqueous solution, to a solution of a source of carbonate ions. This source may be an alkali metal carbonate, or a mixture of alkali metal carbonate and alkali metal bicarbonate, provided the mixture does not contain more than 50% by weight of the bicarbonate. The relative proportions are selected such that the gel which results has an aluminum oxide ($Al_2O_3$) content of between ½ and 3% by weight. The relationship between the carbonate source and the aluminum compound is such that there are approximately six atoms of sodium for every mole of aluminum as $Al_2O_3$.

The gels produced according to the present invention are not believed to have a true hydroxide structure but rather are complex dynamic systems wherein trivalent aluminum ions are surrounded by immobilized water shells stabilized by foreign anions and cations. The very high field strength of the trivalent aluminum ion causes a decrease in fluidity and also a large decrease in entropy of the water surrounding the ions. Some clustering or polymerization of the highly hydrated ions usually occurs to form stable micelles.

The new powder gel products have been found to be considerably more stable than normal powdered aluminum hydroxide gels and have excellent antiproteolytic properties.

DESCRIPTION OF THE PREFERRED EMBODIMENTS

The new improved gels are produced in a dilute aqueous solution at low temperatures from about 0 to 5° C. under conditions of high mass transfer and low shear rates. The preferred technique is to introduce small amounts of an aluminum chloride solution into an aqueous solution of alkali metal carbonate or a mixture of alkali metal carbonate and bicarbonate. The low shear rate is accomplished by using a mixing device including a turbine of large diameter at relatively slow rotational speeds. The result is a stable micellular structure which permits rapid pentration of protons to react with the trivalent aluminum ions. The reaction may be represented by the following simplified equation:

$$2AlCl_3 \cdot 6H_2O + 2Na_2CO_3 + 2NaHCO_3$$
$$+ XH_2O \rightarrow Al_2O_3 \cdot xH_2O \cdot yCO_2 + 6NaCl$$
$$+ 13H_2O + (4-y)CO_2$$

Shortly after formation, the highly hydrous positively charged micelles are separated from the mother liquor and washed free of electrolytes with water. The desiccation of the gel is then carried out by any of several methods including dispersion drying, flash drying or spray drying depending upon the physio-chemical properties sought in the final product.

Sodium carbonate is the preferred reactant because of its low cost and availability. Potassium carbonate can also be used where complete freedom from sodium is desired.

I prefer to add the aluminum chloride in the form of relatively dilute aqueous solution, on the order of 10 to 20% by weight although more concentrated solutions up to 30% by weight or so can be employed. It is also possible to add the aluminum chloride as a dry powder in the form of its hexahydrate. As previously mentioned, sufficient aluminum is added in the form of aluminum chloride to provide an aluminum oxide content of from 0.5 to 3% by weight in the hydrogel. The preferred procedure is to add the solution of aluminum chloride to a solution of sodium carbonate in the molar ratio previously indicated. Normally, the concentration of the carbonate solution will be on the order of 2 to 10% by weight, when used in conjunction with an aluminum chloride solution having a concentration of 10 to 20% by weight.

The gel after drying is a non-gritty powder containing from about 0.2 to about 0.65 mole of carbonate, calculated as $CO_2$, per mole of aluminum calculated as $Al_2O_3$. It also contains adsorbed sodium in an amount of from about 0.04 to 0.1 mole of sodium for every mole of $Al_2O_3$.

The improved gels of the present invention can be combined with compatible, physiologically acceptable antacids to produce antacid compositions in which the gel content is at least 50% by weight. Typical antacid compositions which can be employed for this purpose are glycine, magnesium carbonate, magnesium hydroxide, calcium carbonate, magnesium oxide and magnesium trisilicate.

Three stringent procedures were used to evaluate the antacid activity of the new gel and two blends of the gel with other antacid materials. The first two procedures were quite similar in that the sample was added to a reaction cell containing artificial gastric fluid. Additional fluid was pumped in at a constant rate and excess fluid was continually removed. The pH was recorded as a function of time. The first procedure, being the Holbert et al. method (J. A. Ph. A., vol. 36, p. 149, 1947) as modified by Beekman (J. A. Ph. A., vol. 49, p. 191, 1960) used a relatively weak (0.0316 N) gastric fluid initially and as a replacement fluid. The second method, consisting of the Johnson and Duncan method as modified by Schaub used a stronger gastric fluid (0.05 N) initially and replaced that with 1.0 N fluid. The third method consisted of a Bachrach constant pH 3.5 titration. Since pepsin is a normal constituent of all gastric fluid, it was decided to include it in the titrant which was simulated gastric fluid, USP, standardized at 0.0875 N.

When a 1 gram sample of the improved gel was tested by the Holbert et al. procedure, as modified above, the pH rose to pH 3.0 in 52 seconds and remained above pH 3.0 for 160 minutes. The pH reached approximately 2.5 after about 200 minutes.

Dried gels produced according to the present invention are sufficiently reactive so that a one gram sample has the ability to raise the pH of simulated gastric juice to 3.0 in no more than 5 minutes, and to maintain the pH at from 3 to 5 for at least 90 minutes when measured by the Beekman modification of the Holbert, Noble, Grote test procedure.

The same test was used with two commercial aluminum hydroxide dried gel products. The results were virtually identical for the two samples. They required about 18 minutes to reach a pH of 3.0. The maximum pH achieved was under 4.0, and this occurred after about 40 minutes. The pH started to decline at about 60 minutes and dropped to below 3.0 in about 90 minutes. The pH dropped below 2.5 in less than 120 minutes. The total time at a pH above 3.0 was only about 72 minutes, and 100 minutes above pH 2.5.

The same materials were tested in the Johnson-Duncan procedure. The dry gel produced according to the present invention caused a rise in the pH to 3.0 in 80 seconds, and in less than 10 minutes to a value of 3.5 where it remained steady to about the 60-minute mark. It then gradually dropped, reaching a pH of 3.0 in about 70 minutes and a pH of 2.0 in about 120 minutes. The pH was above 3.0 for 68 minutes, above pH 2.5 for 83 minutes and above 2.0 for 125 minutes.

The two commercial aluminum hydroxide gels required an average time of 14.5 minutes to reach pH 3.0. The average time at a pH above 3.0 was 23 minutes, above 2.5 for 33 minutes, and above 2.0 for 49 minutes.

The marked advantage of the new gel over typical samples of aluminum hydroxide in both speed and total reactivity was most readily demonstrated by the Bachrach method. It was found that the new gel would neutralize about five times as much gastric fluid in 10 minutes and three times as much in 60 minutes as the next best sample.

A composition was made up containing 2 parts by weight of the new gel and 1 part by weight glycine. The same type of composition was prepared using a commercial aluminum hydroxide gel in the ratio of 2 parts of gel by 1 part of glycine. One gram samples of each composition were tested in each of the three procedures. In the Holbert et al. test, as modified, the combination of the new gel and glycine promptly raised the pH to 3.0 in 13 seconds where it was maintained for almost 125 minutes.

By contrast, the sample employing the standard aluminum hydroxide gel required 32 minutes to reach pH 3.0 and maintained it above 3.0 for 58 minutes.

Other examples illustrating the preparation and properties of the new low temperature (LT) gel compositions are given below, all percentages being by weight:

EXAMPLE I

Preparation of aluminum hydroxide LT dried gel

One thousand pounds light soda ash and fifty pounds sodium bicarbonate USP were dissolved in 3430 gallons of city water. The solution was pumped through a cartridge type filter to remove insoluble impurities and circulated through a brine cooled heat exchanger until the temperature dropped to 0° C.

The mixed 3.7% of $Na_2CO_3$ plus $NaHCO_3$ carbonate solution was transferred to a 5,000 gallon reactor vessel equipped with a large diameter slow speed turbine. A 15% aqueous aluminum chloride solution at 5° C. was added at various rates over an 18-hour period until a filtered and washed sample of the aluminum hydrogel had a pH of about 5.8. Approximately 5,800 pounds of the aluminum chloride solution were required. The precipitated 3° C. hydrogel containing 1% aluminum as $Al_2O_3$ was filtered and washed through a continuous belt vacuum filter. The discharged cake contained about 7% $Al_2O_3$ and 0.02% chlorides. The gel was pumped to a seven-inch atomizing wheel of a Bowen spray drier operating at about 21,000 r.p.m. Air with an inlet temperature of 700° F. evaporated the fine droplets of gel within seconds with an air discharge temperature of about 250° F. The finely divided, free-flowing spherically shaped particles were separated from the hot gases by means of a dust collector and were continuously removed into fiber drums.

The LT dried gel was analyzed to yield the following results:

| | |
|---|---|
| Aluminum oxide ($Al_2O_3$) percent | 57.5 |
| Carbonates as $CO_2$ do | 10.9 |
| Sodium Na do | 0.9 |
| Chlorides Cl do | 0.15 |
| Sulfates $SO_4$ do | 0.17 |
| Water and hydroxyls (by difference) do | 30.4 |
| Acid consuming capacity (ml. 0.1 N HCl per gram) | 332 |
| Apparent density, g./ml. | 0.36 |
| pH | 8.5 |

Antacid properties:
 Holbert, Noble & Grote modified
  Time to pH 3.0: 52 sec.
  Max. pH: 4.0
  Time above pH 3.0: 144 min.
  Time above pH 2.5: 169 min.
 Bachrach constant pH 3.5 titration—Basis 1.0 g. sample
  Titrant—simulated gastric fluid USP (.087 N)
   10 min.: 200
   20 min.: 292
   30 min.: 322
   40 min.: 332
   50 min.: 336
   60 min.: 340

EXAMPLE II

Preparation of aluminum hydroxide LT dried gel-glycine (2:1 blend)

One thousand pounds of aluminum hydroxide LT dried gel prepared as in Example I were mixed with 500 pounds of spray dried glycine NF and intimately blended in a ribbon type blender. The resulting blend was passed through a high speed hammer mill. The comminuted aluminum hydroxide LT dried gel-glycine blend had the following properties:

| | |
|---|---|
| Aluminum oxide ($Al_2O_3$) percent | 35.7 |
| Glycine do | 33.1 |
| Carbonate $CO_2$ do | 4.5 |
| pH (4% suspension) | 7.8 |
| Chlorides Cl percent | 0.17 |
| Sulfates $SO_4$ do | 0.10 |
| Sodium do | 0.60 |
| Apparent density, g./ml. | 0.26 |

Antacid properties:

(1) Acid consuming capacity (ml. 0.1 N HCl per gram): 210
(2) Holbert, Noble & Grote modified:

Time to pH 3.0: 13 sec.
 Max. pH: 4.0
 Time above pH 3.0: 110 min.
 Time above pH 2.5: 140 min.

(3) Bachrach constant pH 3.5 titration—Basis 1.0 g. sample

Titrant—simulated gastric fluid USP (.0875 N)

10 min.: 198
  20 min.: 220
  30 min.: 228
  40 min.: 236
  50 min.: 238
  60 min.: 240

EXAMPLE III

Preparation of aluminum hydroxide LT-magnesium carbonate 4:1 comminuted blend

Eight hundred pounds of aluminum hydroxide LT dried gel prepared in a similar manner as Example I was added to a ribbon blender with 200 pounds of magnesium carbonate N.F. powder and mixed for 30 minutes. The 4:1 blend was then passed slowly through a high speed hammer mill. The resulting comminuted dry blend had the following properties:

| | |
|---|---|
| Aluminum oxide ($Al_2O_3$) percent | 48.7 |
| Magnesium oxide (MgO) do | 7.0 |
| Carbonate $CO_2$ do | 15.0 |
| Chlorides—Cl do | 0.21 |
| Sulfates $SO_4$ do | 0.08 |
| pH (4% suspension) | 8.5 |
| Apparent density g./ml | 0.27 |
| Screen test—percent through 325 mesh percent | 98.9 |

Antacid properties:

(1) Acid consuming capacity (ml. 0.1 N HCl per gram): 310
(2) Holbert, Noble and Grote modified Time to pH 3.0: 15 sec.
 Max. pH: 4.3
 Time above pH 3.0: 150 min.
 Time above pH 2.5: 140 min.

(3) Bachrach constant pH 3.5 titration—Basis 1.0 gram sample

Titrant—simulated gastric fluid N.F. –(0.0875 N)

10 min.: 220
  20 min.: 284
  30 min.: 304
  40 min.: 316
  50 min.: 322
  60 min.: 326

EXAMPLE IV

Preparation of aluminum hydroxide LT-low sodium dried gel

The procedure outlined in Example I was carried out except that 1392 pounds of potassium carbonate was substituted for the mixed sodium salts. The spray dried gel had the following properties:

| | Percent |
|---|---|
| Aluminum oxide $Al_2O_3$ | 54.7 |
| Potassium K | 1.2 |
| Carbonate $CO_2$ | 13.6 |
| Sodium Na | 0.05 |
| Chlorides Cl | 0.11 |
| Sulfates $SO_4$ | 0.15 |
| pH: 8.5. | |

Antacid properties:

(1) Acid consuming capacity (ml. 0.1 N HCl per gram): 281
(2) Holbert, Noble and Grote modified Time to pH 3.0: 100 sec.
 Max. pH: 4.0
 Time above pH 3.0: 138 min.
 time above pH 2.5: 170 min.

compared with other antacid compositions, and the results are listed in the following table:

| Antacid | Max. pH | Time to pH 3.0, sec. | Time (min.) above— | | | Duration, min.[5] |
| --- | --- | --- | --- | --- | --- | --- |
| | | | pH 3.0 | pH 2.5 | pH 2.0 | |
| LT gel [1] | 3.7 | 80 | 68 | 83 | 125 | 125+ |
| Commercial Al(OH)₃, gel A | 3.7 | 910 | 22 | 32 | 49 | 88 |
| Commercial Al(OH)₃, gel B | 3.5 | 838 | 25 | 34 | 49 | 61 |
| Commercial Al(OH)₃, gel C | 3.6 | 958 | 28 | 41 | 57 | 80 |
| Magnesium trisilicate, U.S.P. | 6.8 | 129 | 18 | 21 | 28 | 29+ |
| LT gelglycine blend (2:1) | 4.0 | 30 | 57 | 74 | 102 | 110+ |
| Calcium carbonate, U.S.P. | 5.9 | 2 | 52 | 53 | 58 | 19 |
| Bismuth aluminate, 44% Bi | 1.8 | | | | | 110+ |
| Bismuth subcarbonate, U.S.P. | 2.0 | | | | | 0 |

[1] Antiproteolytic activity of 90-100%.

(3) Bachrach constant pH 3.5 titration—1.0 gram basis

Titrant—simulated gastric fluid N.F. -(0.0875

0 min.: None
10 min.: 110
20 min.: 194
30 min.: 238
40 min.: 272
50 min.: 292
60 min.: 304

EXAMPLE V

Preparation of aluminum hydroxide calcium carbonate glycine dried gel

Basis: Aluminum hydroxide LT dried gel: Glycine 2:1 and 20% w./w. calcium carbonate.

Eight hundred pounds aluminum hydroxide LT dried gel-glycine (2:1 blend) prepared as in Example II were added to a ribbon blender together with 200 pounds calcium carbonate USP spray dried powder. The whole was thoroughly mixed for 30 minutes after which it was passed slowly through a high speed hammer type mill. The resulting comminuted blend had the following properties:

Aluminum oxide $Al_2O_3$ _____percent__ 27.9
Glycine _____do____ 25.3
Calcium carbonate _____do____ 20.5
Carbonate as $CO_2$ _____do____ 18.3
Chlorides Cl _____do____ 0.06
Sulfates $SO_4$ _____do____ 0.16
Apparent density g./ml. _____ 0.27
pH _____ 8.1
Screen test—Percent through 325 mesh _____ 98.2

Antacid properties:
(1) Acid consuming capacity (ml. 0.1 N HCl per gram): 221
(2) Holbert, Noble and Grote modified
   Time to pH 3.0: 9 sec.
   Max. pH: 5.7
   Time above pH 3.0: 122 min.
   Time above pH 2.5: 150 min.
(3) Bachrach constant pH 3.5 titration—1.0 gram basis
   Titrant—simulated gastric fluid USP (0.0875 N)
   10 min.: 220 ml.
   20 min.: 236 ml.
   30 min.: 238 ml.
   40 min.: 240 ml.
   50 min.: 240 ml.
   60 min.: 240 ml.

The antacid and antiproteolytic properties of these materials were also determined by the method of Schaub (Pharm. Acta Helv. vol. 37, pp. 669, 773; vol. 38, p. 15).

The antacid and antiproteolytic activity of the low temperature (LT) dry gel of the present invention has been compared with other antacid compositions, and the results are listed in the following table:

From the foregoing, it will be seen that the antacid properties and the antiproteolytic properties of the new gels are excellent, and that the gels alone or in combination with other antacids are very prompt and completely reactive with gastric juice containing pepsin.

I claim as my invention:

1. The method of making a stable aluminum hydroxide gel which comprises adding aluminum chloride to an aqueous solution of a carbonate source selected from the group consisting of an alkali metal carbonate and mixtures of alkali metal carbonates and alkali metal bicarbonates containing up to 50% by weight of the bicarbonate, there being about six atoms of alkali metal present for each two atoms of aluminum, reacting the reactants at a temperature of 0° to 5° C. to form a gel, the mixture having an amount of aluminum present to provide a gel containing from about 0.5 to 3% $Al_2O_3$ by weight, washing the resulting gel to remove soluble salts and to reduce the alkali metal content to no more than about 0.1 mole of alkali metal per mole of $Al_2O_3$, and rapidly drying the resulting gel.

2. The method of claim 1 in which said carbonate source is sodium carbonate.

3. The method of claim 1 in which said aluminum chloride is added as an aqueous solution.

4. The method of claim 2 in which said gel is washed to leave a residual sodium content in the range from 0.04 to 0.1 mole sodium for each mole of $Al_2O_3$.

5. A stable, dried aluminum hydroxide gel comprising the product produced by the method of claim 1 and having the ability to raise the pH of simulated gastric fluid to 3.0 in no more than 5 minutes and maintaining the pH in the range from 3 to 5 for at least 90 minutes when tested by the Beekman modification of the Holbert, Noble and Grote test procedure.

6. The method of claim 1 in which sufficient carbonate is present to provide from 0.2 to 0.65 mole of carbonate, calculated as $CO_2$ per mole of aluminum calculated as $Al_2O_3$.

References Cited

UNITED STATES PATENTS 2,783,127  2/1957  Grote _____ 23—315
2,923,660  2/1960  Hallmann _____ 23—315 X

OTHER REFERENCES

Beekman: "Journal of the Pharmaceutical Sciences," vol. 51, No. 7, pp. 679–682 (July 1962).

MILTON WEISSMAN, Primary Examiner

U.S. Cl. X.R.

423—630; 424—157